(12) United States Patent
Fukumitsu

(10) Patent No.: US 10,556,293 B2
(45) Date of Patent: Feb. 11, 2020

(54) LASER MACHINING DEVICE AND LASER MACHINING METHOD

(71) Applicant: HAMAMATSU PHOTONICS K.K., Hamamatsu-shi, Shizuoka (JP)

(72) Inventor: Kenshi Fukumitsu, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 351 days.

(21) Appl. No.: 15/398,332

(22) Filed: Jan. 4, 2017

(65) Prior Publication Data

US 2017/0113298 A1   Apr. 27, 2017

Related U.S. Application Data

(62) Division of application No. 13/322,301, filed as application No. PCT/JP2010/063352 on Aug. 6, 2010, now abandoned.

(30) Foreign Application Priority Data

Aug. 11, 2009   (JP) ................... 2009-186586

(51) Int. Cl.
*B23K 26/00* (2014.01)
*B23K 26/0622* (2014.01)
(Continued)

(52) U.S. Cl.
CPC ...... *B23K 26/0622* (2015.10); *B23K 26/0006* (2013.01); *B23K 26/0604* (2013.01);
(Continued)

(58) Field of Classification Search
CPC ............ B23K 26/0622; B23K 26/0624; B23K 26/53; B23K 26/0006; B23K 26/0604;
(Continued)

(56) References Cited

U.S. PATENT DOCUMENTS 4,873,413 A * 10/1989 Uesugi .................. H01L 21/268
219/121.68
4,925,523 A * 5/1990 Braren ................... A61B 18/20
216/62
(Continued)

FOREIGN PATENT DOCUMENTS

CN   1473087 A   2/2004
CN   1671504 A   9/2005
(Continued)

OTHER PUBLICATIONS

Newport Corporation, Polarization, Apr. 25, 2012 [retrieved on Mar. 16, 2016]. Retrieved from the Internet <URL:http://www.newport.com/Polarization/144921 /1 033/content.aspx>.

*Primary Examiner* — Jimmy Chou
(74) *Attorney, Agent, or Firm* — Drinker Biddle & Reath LLP

(57) ABSTRACT

The controllability of modified spots is improved. A laser processing apparatus 100 comprises a first laser light source 101 for emitting a first pulsed laser light L1, a second laser light source 102 for emitting a second pulsed laser light L2, half-wave plates 104, 105 for respectively changing directions of polarization of the pulsed laser light L1, L2, polarization beam splitters 106, 107 for respectively polarization-separating the pulsed laser light L1, L2 having changed the directions of polarization, and a condenser lens 112 for converging the polarization-separated pulsed laser light L1, L2 at an object to be processed 1. When the directions of polarization of the pulsed laser light L1, L2 changed by the half-wave plates 104, 105 are varied by a light intensity controller 121 in the laser processing apparatus 100, the ratios of the pulsed laser light L1, L2 polarization-separated by the polarization beam splitters 106, 107

(Continued)

are altered, whereby the respective intensities of the pulsed laser light L1, L2 are adjusted.

6 Claims, 13 Drawing Sheets

(51) Int. Cl.
*C03B 33/02* (2006.01)
*B23K 26/53* (2014.01)
*B23K 26/06* (2014.01)
*B28D 5/00* (2006.01)
*B23K 103/00* (2006.01)

(52) U.S. Cl.
CPC ............ *B23K 26/53* (2015.10); *B28D 5/0011* (2013.01); *C03B 33/0222* (2013.01); *B23K 2103/54* (2018.08); *B23K 2103/56* (2018.08)

(58) Field of Classification Search
CPC ............ B23K 26/0613; B23K 2103/56; B23K 2101/40; B23K 2103/54; B28D 5/0005; B28D 5/0011; C03B 33/0222
USPC ............ 219/121.76, 121.69, 121.72, 121.73, 219/121.8
See application file for complete search history.

(56) References Cited

U.S. PATENT DOCUMENTS

| | | | | |
|---|---|---|---|---|
| 5,101,090 A * | 3/1992 | Coyle, Jr. | ............... | B23K 26/03 219/121.68 |
| 5,272,309 A * | 12/1993 | Goruganthu | ....... | B23K 26/0604 219/121.63 |
| 5,920,668 A * | 7/1999 | Uehara | ............... | H01S 3/06704 372/6 |
| 6,031,201 A * | 2/2000 | Amako | ................ | B23K 26/067 219/121.68 |
| 6,103,988 A * | 8/2000 | Kim | ...................... | G02B 6/2551 219/121.63 |
| 6,324,195 B1 * | 11/2001 | Suzuki | ............... | B23K 26/0604 257/E27.125 |
| 6,433,301 B1 * | 8/2002 | Dunsky | ................ | B23K 26/073 219/121.67 |
| 6,518,540 B1 * | 2/2003 | Wee | ...................... | B23K 26/361 219/121.61 |
| 6,521,866 B1 * | 2/2003 | Arai | ................... | B23K 26/0626 219/121.7 |
| 6,541,731 B2 * | 4/2003 | Mead | ................. | B23K 26/0604 219/121.7 |
| 6,580,055 B2 * | 6/2003 | Iso | ......................... | B23K 26/06 219/121.7 |
| 6,635,850 B2 * | 10/2003 | Amako | ................ | B23K 26/067 219/121.69 |
| 6,689,985 B2 * | 2/2004 | Lipman | ............... | B23K 26/067 219/121.7 |
| 6,710,289 B2 * | 3/2004 | Iso | ......................... | B23K 26/06 219/121.7 |
| 6,838,639 B2 * | 1/2005 | Kreuter | ............. | B23K 26/0613 219/121.76 |
| 6,849,824 B2 * | 2/2005 | Arai | ................... | B23K 26/0643 219/121.7 |
| 7,078,649 B2 | 7/2006 | Okumura | | |
| 7,192,846 B2 * | 3/2007 | Cordingley | .......... | B23K 26/032 438/463 |
| 7,348,516 B2 * | 3/2008 | Sun | ................... | B23K 26/0613 219/121.61 |
| 7,382,389 B2 * | 6/2008 | Cordingley | .......... | B23K 26/032 347/224 |
| 7,508,850 B2 | 3/2009 | Newman et al. | | |
| 7,633,034 B2 * | 12/2009 | Bruland | ............. | B23K 26/0604 219/121.67 |
| 7,671,295 B2 * | 3/2010 | Sun | ........................ | B23K 26/04 219/121.6 |
| 7,723,642 B2 * | 5/2010 | Gu | ........................... | B23K 26/04 219/121.68 |
| 7,728,955 B2 * | 6/2010 | Munnig Schmidt | ....................... | G03F 7/70291 355/69 |
| 7,763,179 B2 * | 7/2010 | Levy | ........................ | B41M 5/24 216/94 |
| 7,807,939 B2 * | 10/2010 | Nagashima | ........ | B23K 26/0604 219/121.64 |
| 7,825,349 B2 * | 11/2010 | Chen | ..................... | B23K 26/03 219/121.68 |
| 7,955,905 B2 * | 6/2011 | Cordingley | .......... | B23K 26/032 438/132 |
| 7,955,906 B2 * | 6/2011 | Cordingley | .......... | B23K 26/032 438/132 |
| 8,148,211 B2 * | 4/2012 | Bruland | ............ | H01L 21/76894 219/162 |
| 8,158,493 B2 * | 4/2012 | Shah | ...................... | B23K 26/38 438/463 |
| 8,193,468 B2 * | 6/2012 | Cordingley | .......... | B23K 26/032 219/121.69 |
| 8,217,304 B2 * | 7/2012 | Cordingley | .......... | B23K 26/032 219/121.76 |
| 2001/0050931 A1 * | 12/2001 | Iso | ........................ | B23K 26/06 372/25 |
| 2002/0050488 A1 * | 5/2002 | Nikitin | ............... | B23K 26/0604 219/121.64 |
| 2002/0063113 A1 * | 5/2002 | Wiggermann | ..... | B23K 26/0604 219/121.7 |
| 2002/0139786 A1 * | 10/2002 | Amako | ................ | B23K 26/067 219/121.76 |
| 2002/0167581 A1 | 11/2002 | Cordingley et al. | | |
| 2003/0024911 A1 * | 2/2003 | Horsting | ............ | B23K 26/0604 219/121.71 |
| 2003/0127439 A1 * | 7/2003 | Wee | ...................... | B23K 26/361 219/121.73 |
| 2003/0141288 A1 * | 7/2003 | Mayer | ................ | B23K 26/0604 219/121.73 |
| 2003/0155336 A1 * | 8/2003 | Kreuter | ............. | B23K 26/0604 219/121.76 |
| 2003/0205561 A1 * | 11/2003 | Iso | ......................... | B23K 26/06 219/121.71 |
| 2004/0002199 A1 * | 1/2004 | Fukuyo | ................ | B23K 26/03 438/460 |
| 2004/0011772 A1 * | 1/2004 | Okumura | ........... | B23K 26/0604 219/121.69 |
| 2004/0134894 A1 * | 7/2004 | Gu | ........................... | B23K 26/04 219/121.68 |
| 2005/0067388 A1 * | 3/2005 | Sun | ..................... | B23K 26/0613 219/121.61 |
| 2005/0184037 A1 * | 8/2005 | Fukuyo | ................ | B23K 26/03 219/121.72 |
| 2005/0202596 A1 | 9/2005 | Fukuyo et al. | | |
| 2005/0247683 A1 * | 11/2005 | Agarwal | ............ | B23K 26/0604 219/121.73 |
| 2005/0272223 A1 | 12/2005 | Fujii et al. | | |
| 2006/0011593 A1 | 1/2006 | Fukuyo et al. | | |
| 2006/0148212 A1 * | 7/2006 | Fukuyo | .............. | B23K 26/0853 438/463 |
| 2006/0255024 A1 * | 11/2006 | Fukuyo | ............ | A61M 5/3272 219/121.72 |
| 2007/0125757 A1 * | 6/2007 | Fukuyo | .............. | B23K 26/0604 219/121.72 |
| 2007/0158314 A1 * | 7/2007 | Fukumitsu | ............ | B28D 1/221 219/121.6 |
| 2008/0000886 A1 * | 1/2008 | Bell | .................... | B23K 26/0884 219/121.68 |
| 2008/0239300 A1 * | 10/2008 | Watanabe | ................ | G01J 1/04 356/229 |
| 2008/0290078 A1 * | 11/2008 | Nomaru | ............. | B23K 26/0604 219/121.67 |
| 2009/0032509 A1 * | 2/2009 | Kuno | ................. | B23K 26/0853 219/121.72 |

(56) References Cited

U.S. PATENT DOCUMENTS

| | | | |
|---|---|---|---|
| 2009/0057284 A1* | 3/2009 | Fukuda | B23K 26/0604 219/121.72 |
| 2009/0107967 A1* | 4/2009 | Sakamoto | B28D 5/0011 219/121.72 |
| 2009/0170239 A1* | 7/2009 | Li | H01L 21/486 438/106 |
| 2010/0015783 A1* | 1/2010 | Fukuyo | B28D 1/221 438/463 |
| 2010/0025387 A1* | 2/2010 | Arai | B28D 5/00 219/121.69 |
| 2010/0200550 A1* | 8/2010 | Kumagai | B28D 5/0011 219/121.72 |
| 2010/0317172 A1* | 12/2010 | Morikazu | B23K 26/0608 438/463 |
| 2011/0001220 A1* | 1/2011 | Sugiura | B28D 5/0011 257/618 |
| 2011/0309060 A1* | 12/2011 | Iwaki | B23K 26/40 219/121.72 |
| 2012/0091107 A1* | 4/2012 | Sugiura | B28D 1/221 219/121.72 |
| 2012/0234808 A1* | 9/2012 | Nakano | B23K 26/03 219/121.72 |
| 2013/0068739 A1* | 3/2013 | Sugiura | B23K 26/38 219/121.72 |
| 2014/0251963 A1* | 9/2014 | Kawaguchi | B23K 26/0665 219/121.73 |
| 2016/0039044 A1* | 2/2016 | Kawaguchi | C03B 33/0222 219/121.69 |

FOREIGN PATENT DOCUMENTS

| | | |
|---|---|---|
| CN | 1720117 A | 1/2006 |
| CN | 1902026 A | 1/2007 |
| CN | 101293307 A | 10/2008 |
| CN | 101407912 A | 4/2009 |
| DE | 4102936 A1 | 8/1992 |
| JP | 02182389 * | 7/1990 |
| JP | 2604395 B2 | 4/1997 |
| JP | 2000-252574 A | 9/2000 |
| JP | 2003-205383 A | 7/2003 |
| JP | 2003-215376 A | 7/2003 |
| JP | 2004-337903 A | 12/2004 |
| JP | 2005-199323 A | 7/2005 |
| JP | 2006-175487 A | 7/2006 |
| JP | 2006-297464 A | 11/2006 |
| JP | 2006-305586 A | 11/2006 |
| JP | 2007-21511 | 2/2007 |
| JP | 2007-268581 A | 10/2007 |
| JP | 2008-18456 | 1/2008 |
| JP | 2008-272794 A | 11/2008 |
| KR | 2008-0096400 A | 10/2008 |
| TW | 200408486 A | 6/2004 |
| TW | 200533454 A | 10/2005 |
| TW | 200800456 A | 1/2008 |
| WO | WO-2005/099957 A2 | 10/2005 |

* cited by examiner

LASER MACHINING DEVICE AND LASER MACHINING METHOD

CROSS-REFERENCE TO RELATED APPLICATIONS

This application is a divisional application of U.S. patent application Ser. No. 13/322,301, filed Nov. 23, 2011, the entire contents of which is incorporated herein by reference. U.S. patent application Ser. No. 13/322,301 is a § 371 national stage application of PCT/JP2010/063352, filed Aug. 6, 2010, which claims the benefit of Japanese Patent Application No. 2009-185586, filed Aug. 11, 2009.

TECHNICAL FIELD

The present invention relates to a laser processing apparatus and laser processing method for forming a modified region in an object to be processed.

BACKGROUND ART

Known as a conventional laser processing apparatus is one which converges first and second laser light having wavelengths different from each other at an object to be processed, so as to cut the object. For example, the following Patent Literature 1 discloses a laser processing apparatus which ablates a portion of a substrate by using a first radiation pulse of a first ultraviolet wavelength and a second radiation pulse of a second ultraviolet wavelength longer than the first ultraviolet wavelength. For example, the following Patent Literature 2 discloses a laser processing apparatus which cuts an object to be processed by using an oscillated wave of laser light and its harmonic.

On the other hand, a laser processing apparatus has recently been developed, which converges pulsed laser light at an object to be processed, so as to form a plurality of modified spots within the object along a line to cut and cause the plurality of modified spots to produce a modified region as disclosed in the following Patent Literature 3, for example.

CITATION LIST

Patent Literature

Patent Literature 1: Japanese Patent Application Laid-Open No. 2-182389
Patent Literature 2: Japanese Patent Publication No. 2604395
Patent Literature 3: Japanese Patent Application Laid-Open No. 2004-337903

SUMMARY OF INVENTION

Technical Problem

Laser processing apparatus such as those mentioned above have been required to improve their controllability of modified spots. That is, it has been desired for them to accurately control the size of modified spots and the length of fractures generated from the modified spots (hereinafter simply referred to as "fracture length") according to the thickness, material, and the like of the object, for example.

It is therefore an object of the present invention to provide a laser processing apparatus and laser processing method which can improve the controllability of modified spots.

Solution to Problem

For achieving the above-mentioned object, the laser processing apparatus in accordance with one aspect of the present invention is a laser processing apparatus for converging a plurality of pulsed laser light at an object to be processed, so as to form a plurality of modified spots within the object along a line to cut and cause the plurality of modified spots to produce a modified region, the apparatus comprising a first laser light source for emitting a first pulsed laser light having a first wavelength, a second laser light source for emitting a second pulsed laser light having a second wavelength different from the first wavelength, a first half-wave plate for changing a direction of polarization of the first pulsed laser light, a second half-wave plate for changing a direction of polarization of the second pulsed laser light, polarization separation means for polarization-separating the first pulsed laser light having the direction of polarization changed by the first half-wave plate and the second pulsed laser light having the direction of polarization changed by the second half-wave plate, a condenser lens for converging at the object the first and second pulsed laser light polarization-separated by the polarization separation means, and light intensity control means for controlling an intensity of the first and second pulsed laser light by varying the directions of polarization of the first and second pulsed laser light changed by the first and second half-wave plates.

The laser processing apparatus in accordance with another aspect of the present invention is a laser processing apparatus for converging a plurality of pulsed laser light at an object to be processed, so as to form a plurality of modified spots within the object along a line to cut and cause the plurality of modified spots to produce a modified region, the apparatus comprising a first laser light source for emitting a first pulsed laser light having a first wavelength, a nonlinear optical crystal for receiving the first pulsed laser light and emitting the first pulsed laser light and a second pulsed laser light having a second wavelength different from the first wavelength, a first half-wave plate for changing a direction of polarization of the first pulsed laser light, a second half-wave plate for changing a direction of polarization of the second pulsed laser light, polarization separation means for polarization-separating the first pulsed laser light having the direction of polarization changed by the first half-wave plate and the second pulsed laser light having the direction of polarization changed by the second half-wave plate, a condenser lens for converging at the object the first and second pulsed laser light polarization-separated by the polarization separation means, and light intensity control means for controlling an intensity of the first and second pulsed laser light by varying the directions of polarization of the first and second pulsed laser light changed by the first and second half-wave plates.

In these aspects of the present invention, when the directions of polarization of the first and second pulsed laser light changed by the first and second half-wave plates are varied by the light intensity control means, the ratios of the first and second pulsed laser light polarization-separated by the polarization separation means are altered. As a result, the respective intensities of the first and second pulsed laser light can be adjusted. Therefore, the respective intensities of the first and second pulsed laser light can be controlled desirably without greatly changing the pulse widths of the first and second pulsed laser light, for example. Hence, high-quality modified spots having favorable sizes and fracture lengths can be formed accurately. That is, the present invention can improve the controllability of modified spots.

Preferably, the laser processing apparatus further comprises pulse width control means for controlling a pulse width of the first pulsed laser light emitted from the first laser light source, while the pulse width control means changes the pulse width of the first pulsed laser light, so as to lower a harmonic conversion efficiency of the nonlinear optical crystal such that the nonlinear optical crystal emits no second pulsed laser light. This makes it possible to converge the first pulsed laser light alone at the object, so as to form the modified spots.

Preferably, the laser processing apparatus further comprises concentering means for making the first and second pulsed laser light concentric with each other. This can simplify the structure of optical systems concerning the first and second pulsed laser light.

The polarization separation means may include a first polarization beam splitter for polarization-separating the first pulsed laser light having the direction of polarization changed by the first half-wave plate and a second polarization beam splitter for polarization-separating the second pulsed laser light having the direction of polarization changed by the second half-wave plate.

Preferably, the light intensity control means has a greater width of controllability for the first pulsed laser light than for the second pulsed laser light. This can favorably form high-quality modified spots in the object.

Preferably, the light intensity control means makes the intensity of the first pulsed laser light lower than an intensity threshold at which the modified spots are formed when the first pulsed laser light is converged alone at the object. In this case, for forming the modified spots, the first and second pulsed laser light act as auxiliary and main pulsed laser light, respectively. In addition, the first pulsed laser light acts favorably so as not to affect the second pulsed laser light. As a result, high-quality modified spots can be formed in the object.

The laser processing apparatus in accordance with still another aspect of the present invention is a laser processing apparatus for converging a plurality of pulsed laser light at an object to be processed, so as to form a plurality of modified spots within the object along a line to cut and cause the plurality of modified spots to produce a modified region, the apparatus comprising a first laser light source for emitting a first pulsed laser light having a first wavelength, a second laser light source for emitting a second pulsed laser light having a second wavelength different from the first wavelength, and a condenser lens for converging the first and second pulsed laser light at the object; wherein the first pulsed laser light has an intensity made lower than an intensity threshold at which the modified spots are formed when the first pulsed laser light is converged alone at the object.

The laser processing apparatus in accordance with a further aspect of the present invention is a laser processing apparatus for converging a plurality of pulsed laser light at an object to be processed, so as to form a plurality of modified spots within the object along a line to cut and cause the plurality of modified spots to produce a modified region, the apparatus comprising a first laser light source for emitting a first pulsed laser light having a first wavelength, a nonlinear optical crystal for receiving the first pulsed laser light and emitting the first pulsed laser light and a second pulsed laser light having a second wavelength different from the first wavelength, and a condenser lens for converging the first and second pulsed laser light at the object; wherein the first pulsed laser light has an intensity made lower than an intensity threshold at which the modified spots are formed when the first pulsed laser light is converged alone at the object.

The laser processing method in accordance with a still further aspect of the present invention is a laser processing method of converging a plurality of pulsed laser light at an object to be processed, so as to form a plurality of modified spots within the object along a line to cut and cause the plurality of modified spots to produce a modified region; the method comprising the step of converging a first pulsed laser light having a first wavelength and a second pulsed laser light having a second wavelength different from the first wavelength at the object through a condenser lens; wherein the step makes the first pulsed laser light have an intensity lower than an intensity threshold at which the modified spots are formed when the first pulsed laser light is converged alone at the object.

In these aspects of the present invention, the first and second pulsed laser light are converged at the object, so as to form a plurality of modified spots and cause the modified spots to produce a modified region. Here, the intensity of the first pulsed laser light is lower than the intensity threshold at which the modified spots are formed when the first pulsed laser light is converged alone at the object. Hence, for forming the modified spots in this case, the first and second pulsed laser light act as auxiliary and main pulsed laser light, respectively. In addition, the first pulsed laser light acts favorably so as not to affect the second pulsed laser light. As a result, high-quality modified spots can be formed in the object.

The first pulsed laser light may have a wavelength longer than that of the second pulsed laser light.

Advantageous Effects of Invention

The present invention can improve the controllability of modified spots.

DESCRIPTION OF EMBODIMENTS

Figure 1:
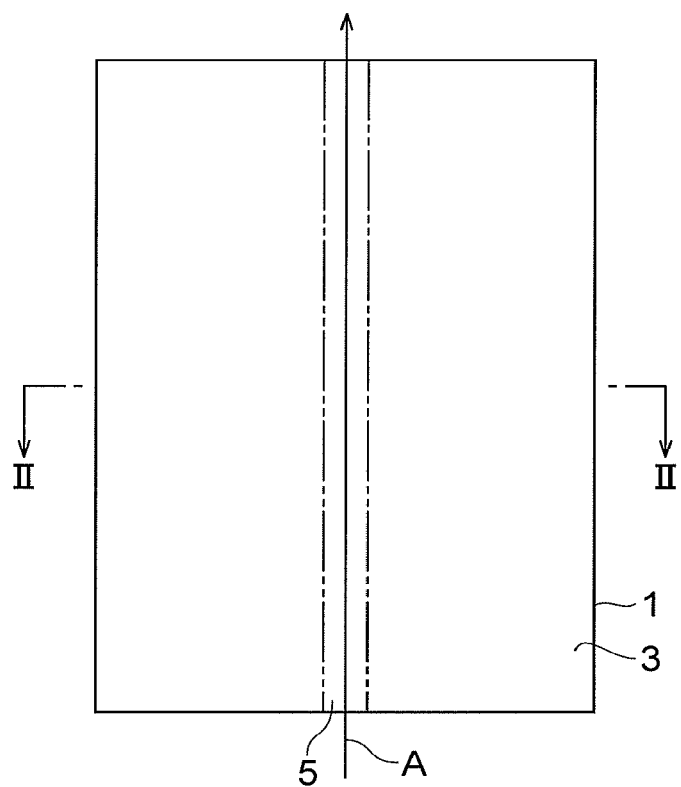
FIG. 1 is a plan view illustrating an example of an object to be processed for which a modified region is formed.

In the following, preferred embodiments of the present invention will be explained in detail with reference to the drawings. In the drawings, the same or equivalent constituents will be referred to with the same signs while omitting their overlapping descriptions.

In the laser processing apparatus and laser processing method in accordance with the embodiments, a plurality of pulsed laser light are simultaneously converged at an object to be processed, so as to form a plurality of modified spots within the object and cause the plurality of modified spots to produce a modified region which becomes a cutting start point. Therefore, the forming of the modified region will firstly be explained with reference to FIGS. 1 to 5.

Figure 2:
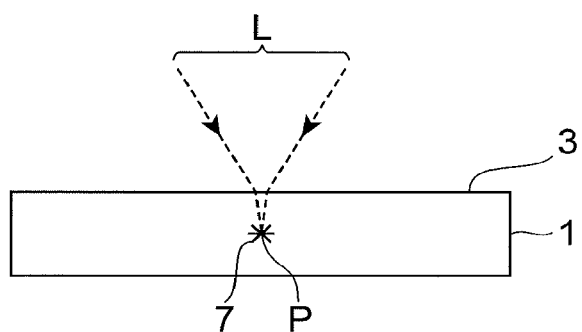
FIG. 2 is a sectional view of the object taken along the line II-II of FIG. 1.
Figure 3:
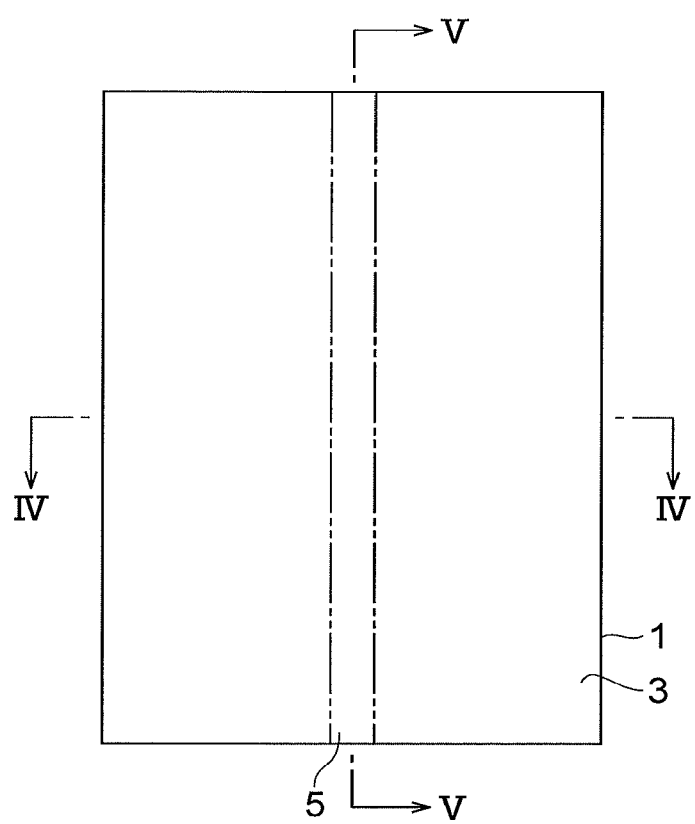
FIG. 3 is a plan view of the object after laser processing.
Figure 4:
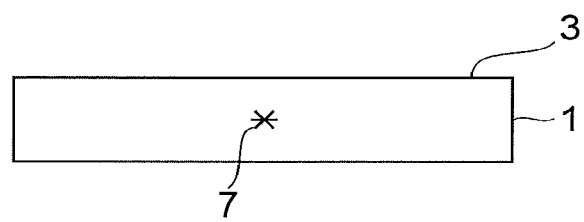
FIG. 4 is a sectional view of the object taken along the line IV-IV of FIG. 3.
Figure 5:
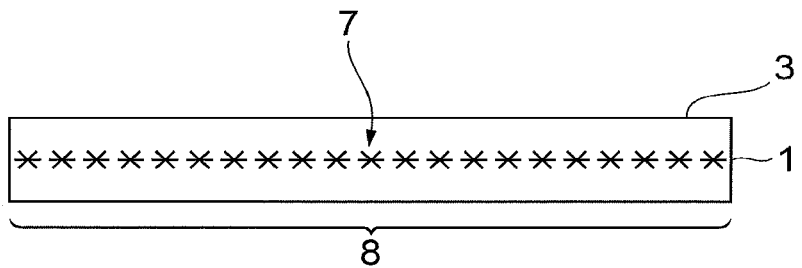
FIG. 5 is a sectional view of the object taken along the line V-V of FIG. 3.

As illustrated in FIG. 1, an object to be processed 1 has a line to cut 5 set for cutting the object 1. The line 5 is a virtual line extending straight. When forming a modified region within the object 1, the laser light L is relatively moved along the line 5 (i.e., in the direction of arrow A in FIG. 1) while locating a converging point P within the object 1 as illustrated in FIG. 2. This forms a modified region 7 within the object 1 along the line 5 as illustrated in FIGS. 3 to 5, whereby the modified region 7 formed along the line 5 becomes a cutting start region 8.

A glass substrate is used as the object 1, for which a semiconductor material, a piezoelectric material, or the like is employable. The converging point P is a position at which the laser light L is converged. The line 5 may be curved instead of being straight and may be a line actually drawn on the front face 3 of the object 1 without being restricted to the virtual line. The modified region 7 may be formed either continuously or intermittently. The modified region 7 may also be formed into rows or dots. It will be sufficient if the modified region 7 is formed at least within the object 1. There are cases where fractures are formed from the modified region 7 acting as a start point, and the fractures and modified region 7 may be exposed at outer surfaces (the front face, rear face, and outer peripheral face) of the object 1.

Here, the laser light L is absorbed in particular in the vicinity of the converging point within the object 1 while being transmitted therethrough, whereby the modified region 7 is formed in the object 1 (internal absorption type laser processing). Therefore, the front face 3 of the object 1 hardly absorbs the laser light L and thus does not melt. In the case of forming a removing part such as a hole or groove by melting it away from the front face 3, the processing region gradually progresses from the front face 3 side to the rear face side in general (surface absorption type laser processing).

The modified region formed in this embodiment means regions whose physical characteristics such as density, refractive index, and mechanical strength have attained states different from those of their surroundings. Examples of the modified region include molten processed regions, crack regions, dielectric breakdown regions, refractive index changed regions, and their mixed regions. Further examples of the modified region include an area where the density of the modified region has changed from that of an unmodified region in the material of the object and an area formed with a lattice defect (which can collectively be referred to as a high-density transitional region).

The molten processed regions, refractive index changed regions, areas where the modified region has a density different from that of the unmodified region, and areas formed with a lattice defect may further incorporate a fracture (cut or microcrack) therewithin or at an interface between the modified and unmodified regions. The incorporated fracture may be formed over the whole surface of the modified region or in only a part or a plurality of parts thereof.

This embodiment produces the modified region 7 by faulting a plurality of modified spots (processing scars) along the line 5. A plurality of modified spots, each of which is a modified part formed by a shot of one pulse of the pulsed laser light (i.e., one pulse of laser irradiation), gather to form the modified region 7. Examples of the modified spot include crack spots, molten processed spots, refractive index changed spots, and those mixed with at least one of them.

For the modified spots, it is preferred to control their size and the length of fractures occurring therefrom (hereinafter also referred to as "fracture length") appropriately in view of the required cutting accuracy, flatness of cut sections, thickness, kind, and crystal orientation of the object, and the like.

That is, when the modified spots are too large or the fracture length is too long, fluctuations in the size of modified spots and fracture length become greater, thereby lowering the accuracy in cutting the object 1 along the line 5. This also enhances irregularities on a cut section of the object 1, thereby worsening the flatness of the cut section. When the modified spots are too small, on the other hand, the object is harder to cut.

When the size of modified spots and fracture length are made appropriate, they can be formed uniformly, while deviations from the line 5 can be suppressed. This can also improve the accuracy in cutting the object 1 along the line 5 and the flatness of the cut section.

Figure 6:
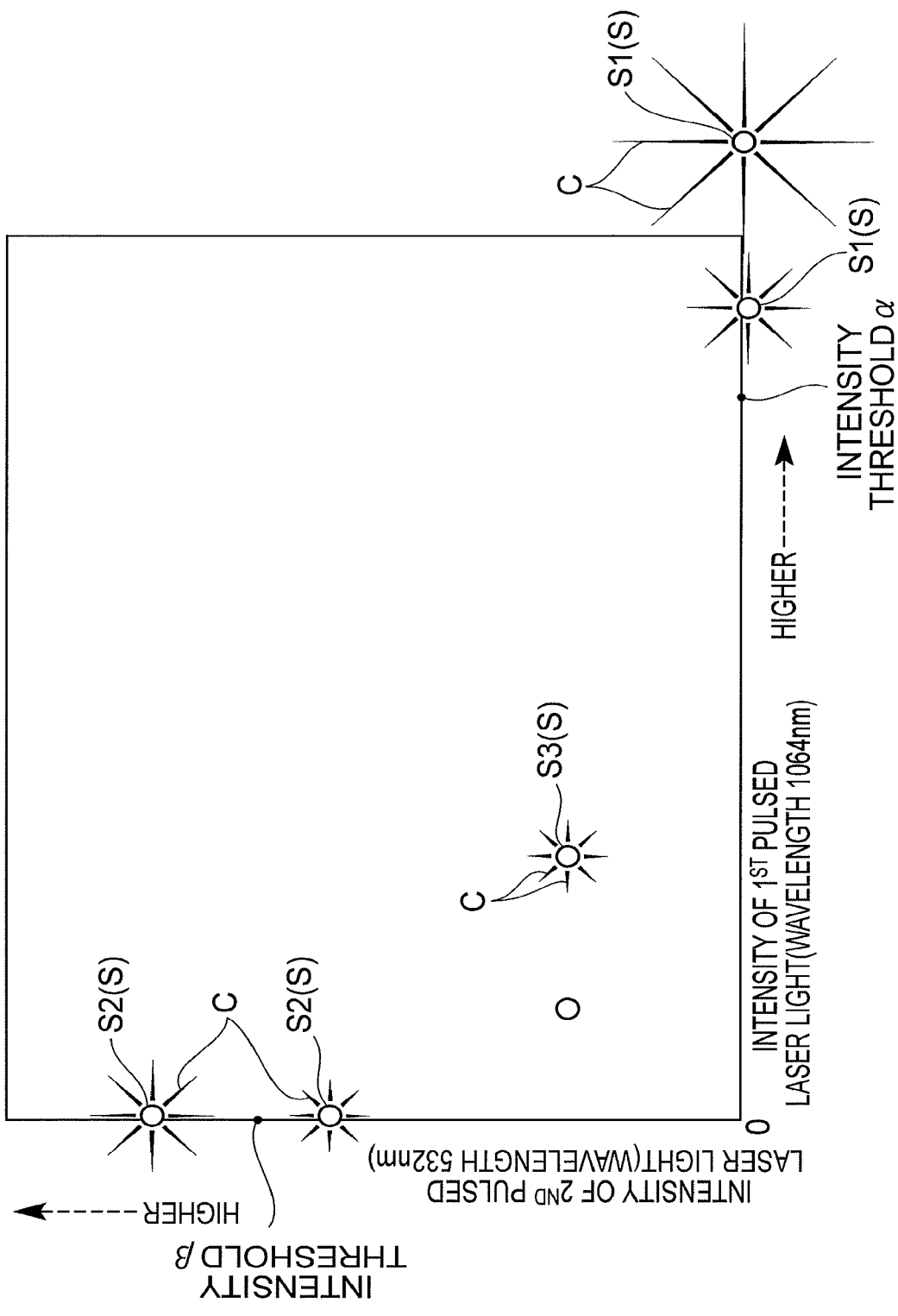
FIG. 6 is a chart for explaining relationships between the intensity of pulsed laser light and modified spots.

FIG. 6 is a chart for explaining relationships between the intensity of pulsed laser light and modified spots. As illustrated in FIG. 6, modified spots S can be controlled by regulating the intensity (power) of pulsed laser light. Specifically, the size of modified spots S and the length of fractures C can be made smaller when the intensity of the pulsed laser light is lowered. On the other hand, the size of modified spots S and the length of fractures C can be made greater when the intensity of the pulsed laser light is enhanced. The intensity of pulsed laser light can be represented by the peak power density per pulse, the energy (J) per pulse, or the average output (W) determined by multiplying the energy per pulse by the frequency of the pulsed laser light, for example.

In the case where pulsed laser light (hereinafter referred to as first pulsed laser light) having a wavelength of 1064 nm is converged alone at the object 1 here, a modified spot S1 is formed when the intensity of the first pulsed laser light is at an intensity threshold $\alpha$ or greater. In the case where pulsed laser light (hereinafter referred to as second pulsed laser light) having a wavelength of 532 nm which is shorter than the wavelength of the first pulsed laser light is converged alone at the object 1, a modified spot S2 is formed when the intensity of the second pulsed laser light is at an intensity threshold $\beta$ or greater, for example.

For example, there is a case where the intensity thresholds $\alpha$ and $\beta$ are 15 µJ and 6 µJ, respectively. The intensity threshold is an intensity of laser light at which a modified region is formed in the object 1. Here, forming the modified spots S is meant to appropriately form modified spots constituting a modified region to become a cutting start region (ditto in the following).

In the case where the first and second pulsed laser light are simultaneously converged at the object 1, a modified spot S3 is also formed at an intensity lower than any of the respective intensities at which the first and second pulsed laser light are converged alone. This modified spot S3 has a characteristic feature similar to that of a modified spot formed by converging pulsed laser light having an ultrashort pulse (e.g., of several psec), i.e., the fractures C attain an appropriate length (a half cut or full cut occurs) with a relatively small modified spot.

Figure 7:
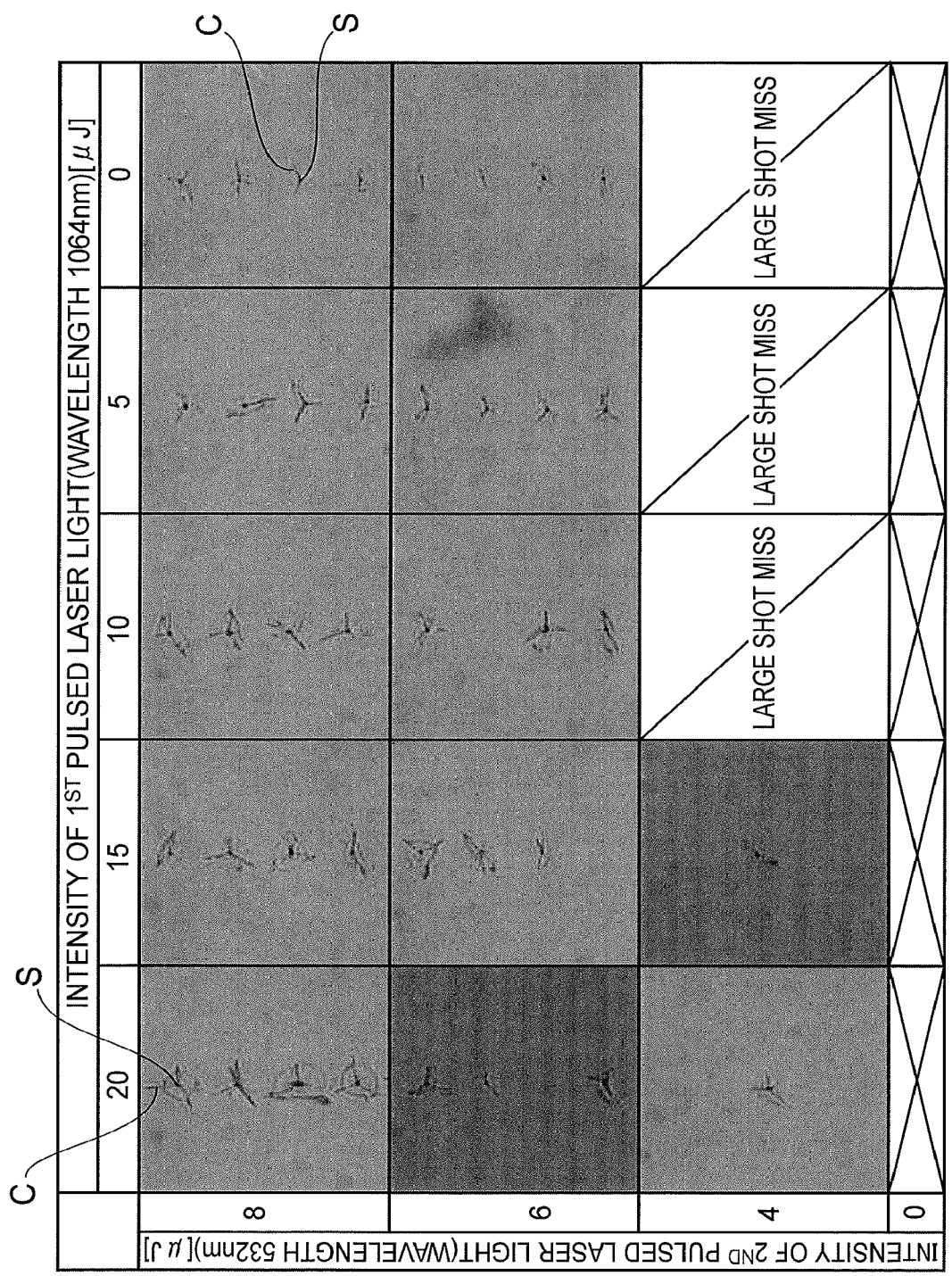
FIG. 7 is a chart illustrating examples of modified spots formed in the object by using first and second laser light.

FIG. 7 is a chart illustrating examples of modified spots formed in the object by using the first and second laser light. Each photograph in the chart is an enlarged plan view illustrating the object 1 formed with the modified spots S. Here, the first and second pulsed laser light each have a pulse pitch of 50 µm, while their directions of polarization lie in their scanning direction (the vertical direction on the chart). The first pulsed laser light at the intensity of 0 µJ means that it is not converged at the object 1 (i.e., the object is irradiated with the second pulsed laser light alone). The second pulsed laser light at the intensity of 0 µJ means that it is not converged at the object 1 (i.e., the object is irradiated with the first pulsed laser light alone). As the object 1, a glass slide is employed.

When the intensity of the second pulsed laser light is 0 µJ, as illustrated in FIG. 7, no modified spots S are formed in the object, whereby processing is impossible. When the intensity of the second pulsed laser light is 6 µJ or less, the modified spots S cannot be formed continuously with a favorable accuracy, whereby a so-called shot miss phenomenon occurs. When the intensity of the second pulsed laser light is 4 µJ in particular, the shot miss phenomenon occurs greatly depending on the intensity of the first pulsed laser light (when the intensity of the first pulsed laser light is 0 to 10 µJ). This shows that controlling the intensity of the second pulsed laser light can suppress the shot miss phenomenon in particular. That is, the second pulsed laser light having a wavelength shorter than that of the first pulsed laser light is used as a main element concerning the forming of the modified spots S.

It is also seen that, as the intensity of the first pulsed laser light is higher, the size of modified spots S becomes greater, a greater number of fractures C occur, and the fracture length increases. Hence, it is seen that controlling the intensity of the first pulsed laser light can adjust the size of modified spots S in particular. Using the first pulsed laser light within a range where its laser intensity is lower than the intensity threshold of the object 1 for this laser light (i.e., the intensity threshold of the object 1 when irradiated with this laser light alone) makes it easier to control the size of modified spots S.

First Embodiment

Figure 8:
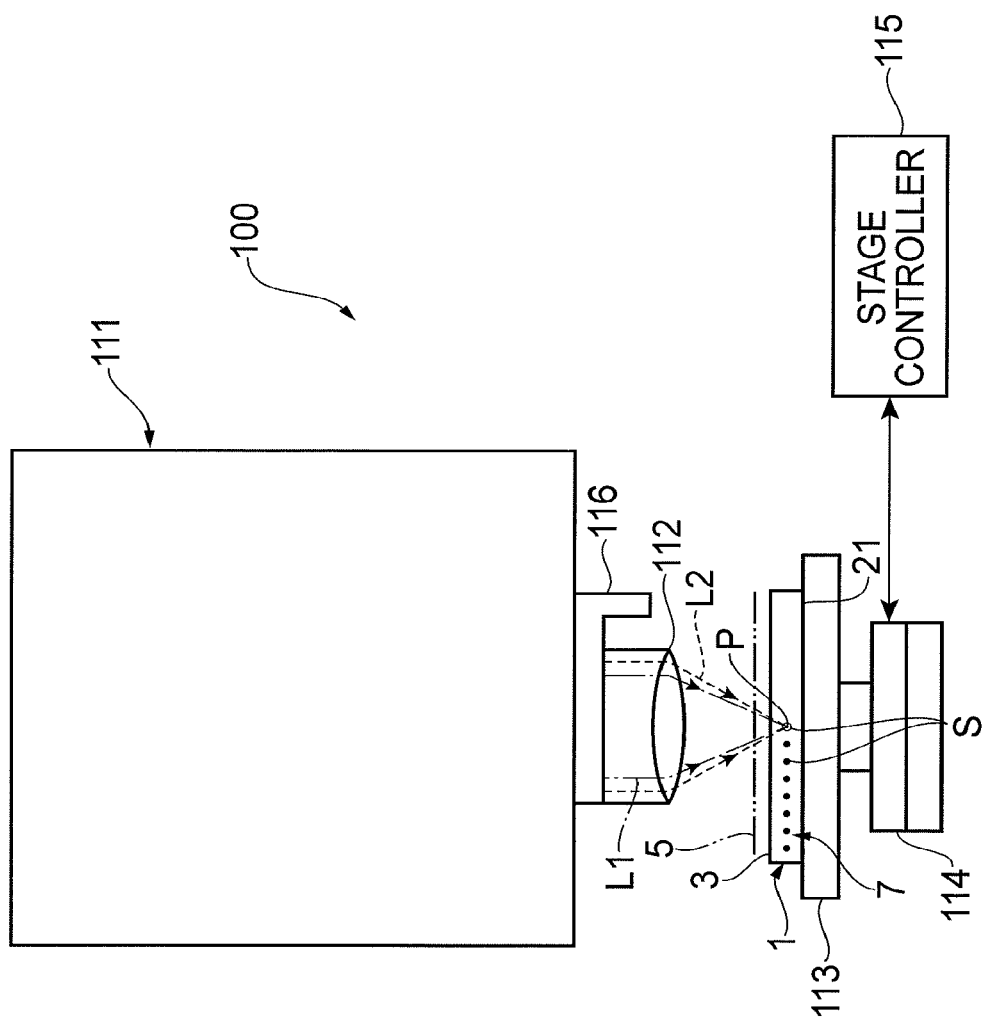
FIG. 8 is a schematic structural diagram illustrating the laser processing apparatus in accordance with a first embodiment of the present invention.

The first embodiment of the present invention will now be explained. FIG. 8 is a schematic structural diagram illustrating the laser processing apparatus in accordance with the first embodiment of the present invention. As illustrated in FIG. 8, the laser processing apparatus 100 comprises a housing 111 for accommodating optical systems concerning the first and second pulsed laser light, a condenser lens 112 for converging the first and second pulsed laser light at the object 1, a support table 113 for supporting the object 1 irradiated with the pulsed laser light L1, L2 converged by the condenser lens 112, a stage 114 for moving the support table 113 along X, Y, and Z axes, and a stage controller 115 for controlling the movement of the stage 114.

The laser processing apparatus 100 also comprises an autofocus unit 116 in order to converge the pulsed laser light L1, L2 accurately at a predetermined position within the object 1, so as to form the modified region 7. This allows the laser processing apparatus 100 to control the pulsed laser light L1, L2 accurately such that they converge at a fixed position from the front face 3 or rear face of the object 1, for example.

Figure 9:
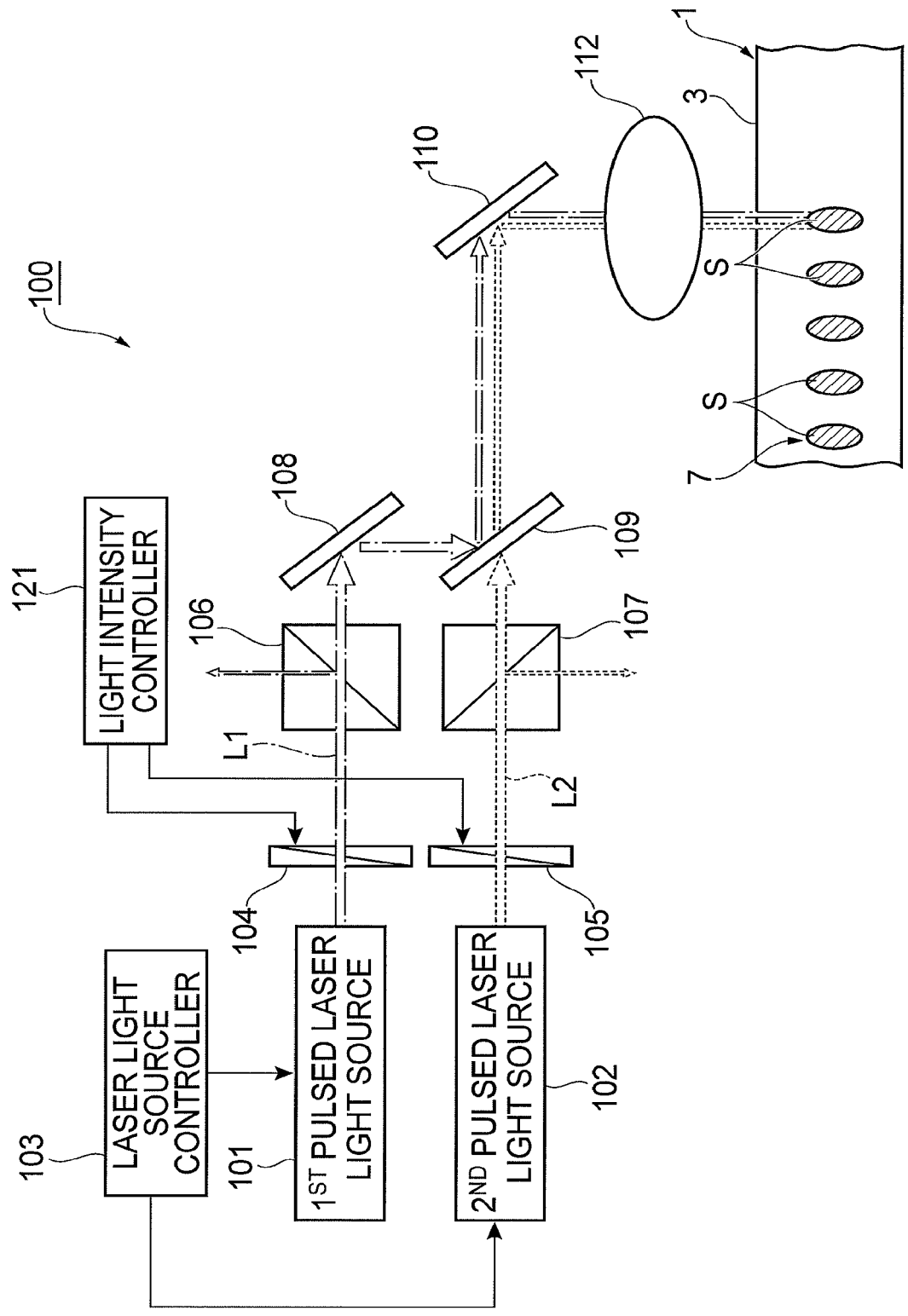
FIG. 9 is a schematic structural diagram illustrating a main part of the laser processing apparatus of FIG. 8.

FIG. 9 is a schematic structural diagram illustrating a main part of the laser processing apparatus of FIG. 8. As illustrated in FIG. 9, the laser processing apparatus 100 comprises first and second pulsed laser light sources 101, 102, a laser light source controller 103, half-wave plates 104, 105, and polarization beam splitters 106, 107.

The first pulsed laser light source (first laser light source) 101 emits the first pulsed laser light L1 having a wavelength of 1064 nm with a pulse width of 23 nsec, for example. The second pulsed laser light source (second laser light source) 102 emits the second pulsed laser light L2 having a wavelength of 532 nm with a pulse width of 15 nsec, for example, as a pulsed laser light having a wavelength shorter than that of the first pulsed laser light L1. Here, the pulsed laser light sources 101, 102 respectively emit the pulsed laser light L1, L2 whose directions of polarization lie in the vertical direction on the drawing sheet. Fiber lasers, for example, can be used as the pulsed laser light sources 101, 102.

The laser light source controller 103 is connected to the first pulsed laser light source 101, so as to adjust the pulse width, pulse timing, and the like of the pulsed laser light L1 emitted from the first pulsed laser light source 101. The laser light source controller 103 is also connected to the second pulsed laser light source 102, so as to adjust the pulse timing and the like of the pulsed laser light L2. The laser light source controller 103 regulates the adjustment of the respective pulse timings of the pulsed laser light sources 101, 102.

The half-wave plates 104, 105 are arranged behind the pulsed laser light sources 101, 102 on the optical axes (optical paths) of the pulsed laser light L1, L2, respectively. The half-wave plate (first half-wave plate) 104 changes the direction of polarization of the first pulsed laser light L1 emitted from the first pulsed laser light source 101. The half-wave plate (second half-wave plate) 105 changes the direction of polarization of the second pulsed laser light L2 emitted from the second pulsed laser light source 102.

The polarization beam splitter (first polarization beam splitter) 106 is arranged behind the half-wave plate 104 on the optical axis of the first pulsed laser light L1. The polarization beam splitter 106 polarization-separates the first pulsed laser light L1 having the direction of polarization changed by the half-wave plate 104. Specifically, in the first pulsed laser light L1, the polarization beam splitter 106 transmits therethrough a constituent polarized in the vertical direction on the drawing sheet, but reflects a constituent polarized in the direction normal to the drawing sheet.

The polarization beam splitter (second polarization beam splitter) 107 is arranged behind the half-wave plate 105 on the optical axis of the second pulsed laser light L2. The polarization beam splitter 107 polarization-separates the second pulsed laser light L2 having the direction of polarization changed by the half-wave plate 105. Specifically, in the second pulsed laser light L2, the polarization beam splitter 107 transmits therethrough a constituent polarized in the vertical direction on the drawing sheet, but reflects a constituent polarized in the direction normal to the drawing sheet.

The laser processing apparatus 100 further comprises a light intensity controller 121. The light intensity controller 121 controls the angles of rotation of the half-wave plates 104, 105 by actuators and the like, so as to vary the directions of polarization of the pulsed laser light L1, L2 changed by the half-wave plates 104, 105.

In the light intensity controller 121, the range in which the direction of polarization of the first pulsed laser light L1 changed by the half-wave plate 104 is variable is greater than the range in which the direction of polarization of the second pulsed laser light L2 changed by the half-wave plate 105 is variable. Therefore, in the light intensity controller 121, the width by which the intensity of the first pulsed laser light L1 is controllable is greater than the width by which the intensity of the second pulsed laser light L2 is controllable.

Figure 10:
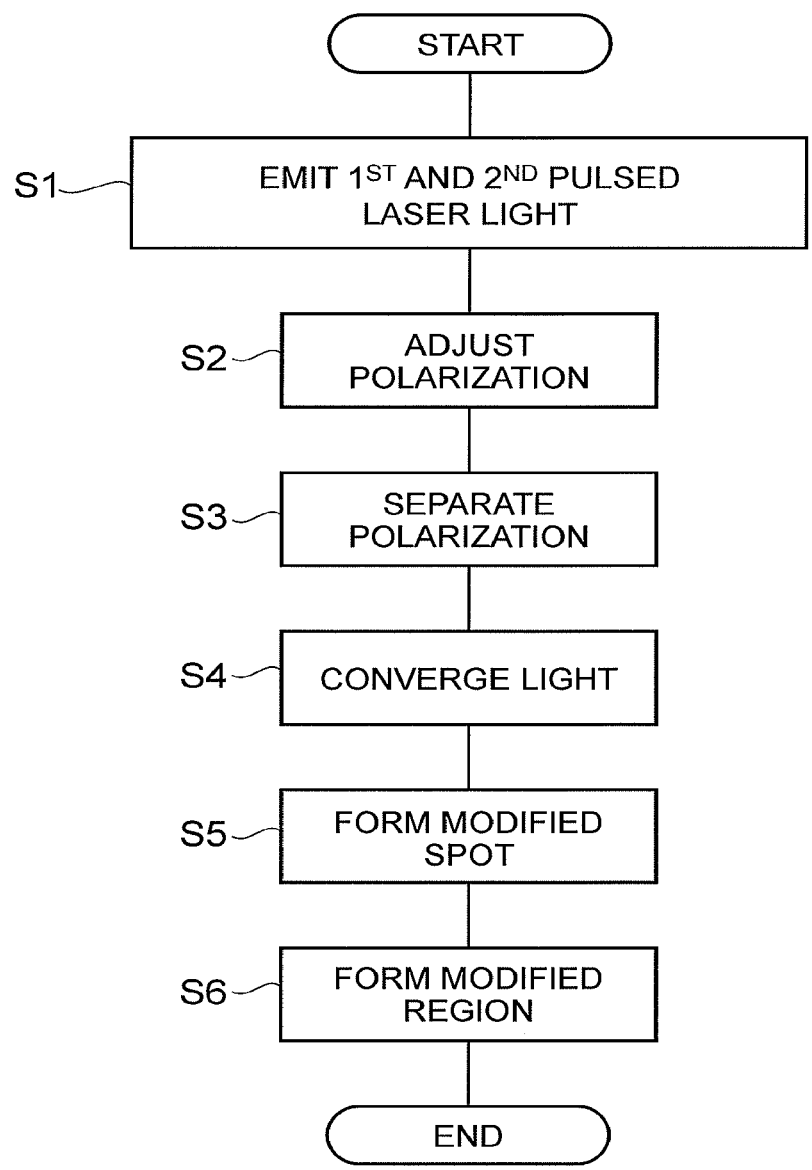
FIG. 10 is a flowchart illustrating operations of a laser processing method using the laser processing apparatus of FIG. 8.

A laser processing method using thus constructed laser processing apparatus 100 will now be explained with reference to a flowchart illustrated in FIG. 10.

In the laser processing apparatus 100 of this embodiment, as illustrated in FIGS. 8 and 9, the object 1, which is a glass substrate or sapphire substrate, having an expandable tape attached to the rear face 21 thereof, is mounted on the stage 114 at first. Subsequently, the object 1 is simultaneously irradiated with the pulsed laser light L1, L2 from the respective pulsed laser light sources 101, 102, while using the front face 3 as a laser light irradiation surface and locating the converging point P within the object 1. Here, the laser light source controller 103 regulates the pulse timings such that the respective pulses of the pulsed laser light L1, L2 overlap each other at least partly.

The first pulsed laser light L1 emitted from the first pulsed laser light source 101 passes through the half-wave plate 104, so as to be adjusted in terms of polarization, and then is polarization-separated by the polarization beam splitter 106 (S2, S3). Subsequently, the first pulsed laser light L1 transmitted through the polarization beam splitter 106 is reflected by dichroic mirrors 108 to 110 in sequence, so as to be made incident on the condenser lens 112.

The second pulsed laser light L2 emitted from the second pulsed laser light source 102 passes through the half-wave plate 105, so as to be adjusted in terms of polarization, and then is polarization-separated by the polarization beam splitter 107 (S2, S3). Subsequently, the second pulsed laser light L2 transmitted through the polarization beam splitter 107 passes through the dichroic mirror 109, so as to become concentric with the first pulsed laser light L1, and is reflected by the dichroic mirror 110 while in this concentric state, so as to be made incident on the condenser lens 112. This converges the pulsed laser light L1, L2 into the object 1, while their directions of polarization lie in the scanning direction (S4). The dichroic mirror 110 is desired to be used for transmitting therethrough the light reflected by the object 1 so as to observe it with a camera device (not depicted) in order to study the object 1. When there is no camera device, a simple reflecting mirror may be used.

Together with such irradiation with the pulsed laser light L1, L2, the stage 114 is driven, so as to move (scan) the object 1 along the line 5 relative to the pulsed laser light L1, L2, thereby forming a plurality of modified spots S within the object 1 along the line 5 and producing the modified region 7 by the modified spots S (S5, S6). Thereafter, the expandable tape is expanded, so as to cut the object 1 along the line 5 from the modified region 7 acting as a cutting start region.

Here, the laser processing apparatus 100 of this embodiment is equipped with the light intensity controller 121. Therefore, by actuating the light intensity controller 121, so as to vary the directions of polarization of the pulsed laser light L1, L2 transmitted through the half-wave plates 104, 105, the laser processing apparatus 100 can change the ratios of the pulsed laser light L1, L2 polarization-separated by the polarization beam splitters 106, 107. As a result, in the pulsed laser light L1, L2, the ratios of polarization direction constituents transmitted through the polarization beam splitters 106, 107 are adjusted appropriately. Hence, the respective intensities of the pulsed laser light L1, L2 converged by the condenser lens 112 are adjusted as desired.

In this regard, when controlling the intensities of the pulsed laser light L1, L2 by adjusting their inputs, for example, as in the conventional laser processing apparatus, their input ranges are hard to adjust greatly because of structures of the pulsed laser light sources 101, 102.

By contrast, as mentioned above, this embodiment can control the respective intensities of the pulsed laser light L1, L2 as desired without greatly changing the input ranges of the pulsed laser light L1, L2. Therefore, this embodiment can accurately form high-quality modified spots S having favorable sizes and fracture lengths in the object 1, thereby improving the controllability of modified spots S.

In particular, as mentioned above, this embodiment forms the modified spots S by simultaneously converging the two pulsed laser light L1, L2 having different wavelengths. This can make the total intensity of pulsed laser light lower than that in the case where the modified spots S are formed by converging one of the pulsed laser light L1, L2 alone (see FIG. 6).

For forming the modified spots S by converging one of the pulsed laser light L1, L2 alone, it has conventionally been necessary for them to have an ultrashort pulse width (e.g., several psec), which may need special laser light sources for the pulsed laser light sources. By contrast, this embodiment can reduce not only the necessity for minimizing the pulse widths of the pulsed laser light L1, L2, but also the need for special laser light sources, whereby typical common laser light sources can be used. This can lower the cost and enhance the reliability and versatility.

In general, for accurately forming the modified spots S by simultaneously converging the pulsed laser light L1, L2, it is preferred to change the intensity of the first pulsed laser light L1 more greatly than the intensity of the second pulsed laser light L2 (see FIG. 7). In this regard, the controllable width of intensity of the first pulsed laser light L1 is greater than the controllable width of intensity of the second pulsed laser light L2 in this embodiment as mentioned above. This can perform favorable laser processing in conformity to the relationship between the intensities of the pulsed laser light L1, L2 at the time of forming the modified spots S, thereby favorably producing high-quality modified spots S in the object 1.

Since the pulsed laser light L1, L2 are made concentric with each other as mentioned above, this embodiment can simplify the structure of optical systems concerning the pulsed laser light L1, L2.

Since the second pulsed laser light L2 is used as a main element for forming the modified spots S as mentioned above, it is preferred for the second pulsed laser light L2 to have a pulse width shorter than that of the first pulsed laser light L1 as in this embodiment.

When converging the pulsed laser light L1, L2 at the object 1 upon irradiation in this embodiment, at least one of the light intensity controller 121 and laser light source controller 103 may be actuated such that the intensity of the first pulsed laser light L1 is lower than the intensity threshold α (see FIG. 6).

Specifically, the intensity of the first pulsed laser light L1 may be made lower than the intensity threshold α at which the modified spots S are formed when the first pulsed laser light L1 is converged alone at the object 1. In other words, the intensity of the first pulsed laser light L1 may be within a predetermined intensity range where the modified spots S are not formed when the first pulsed laser light L1 is converged alone at the object 1.

For forming the modified spots S in this case, the first and second pulsed laser light L1, L2 act as auxiliary and main pulsed laser light, respectively. In addition, the first pulsed laser light L1 acts favorably so as not to affect the second pulsed laser light L2. As a result, high-quality modified spots S can be formed in the object 1. That is, this enables excellent laser processing under multi-wavelength simultaneous irradiation with the pulsed laser light L1, L2 cooperating with each other.

In general, the wavelength, pulse width, peak power, and the like of pulsed laser light required for forming the modified spots S within the object 1 by converging the pulsed laser light vary depending on the kind of the object 1 and the like. When fondling the modified spots S in the object 1 that is a silicon substrate, for example, it is preferred for the pulsed laser light to have a wavelength of 1064 nm and a relatively long pulse width (100 to 200 nsec). When forming the modified spots S in the object 1 that is a glass substrate or sapphire substrate as in this embodiment, it is preferred for the pulsed laser light to have a shorter pulse width so as to enhance the intensity (peak energy).

In this regard, the laser processing apparatus 100 of this embodiment can accurately form the modified spots S not only in the object 1 that is a glass substrate or sapphire substrate as mentioned above, but also in the object 1 that is a silicon substrate. Specifically, a filter or the like is placed on the optical axis of the second pulsed laser light L2 so that the second pulsed laser light L2 is not converged at the object 1. At the same time, the first pulsed laser light L1 having a pulse width of 200 nsec, for example, is converged at the object 1.

Therefore, this embodiment allows the single laser processing apparatus 100 to be used as a processing apparatus for various substrates. The single laser processing apparatus 100 can also easily handle the object 1 such as a bonded substrate constituted by silicon and glass substrates.

In this embodiment, as in the foregoing, the polarization beam splitters 106, 107 constitute the polarization separation means, while the light intensity controller 121 does the light intensity control means. The dichroic mirrors 108, 109 constitute the concentering means, while the laser light source controller 103 does the pulse width control means.

Second Embodiment

The second embodiment of the present invention will now be explained. This embodiment will be explained mainly in terms of differences from the above-mentioned first embodiment.

Figure 11:
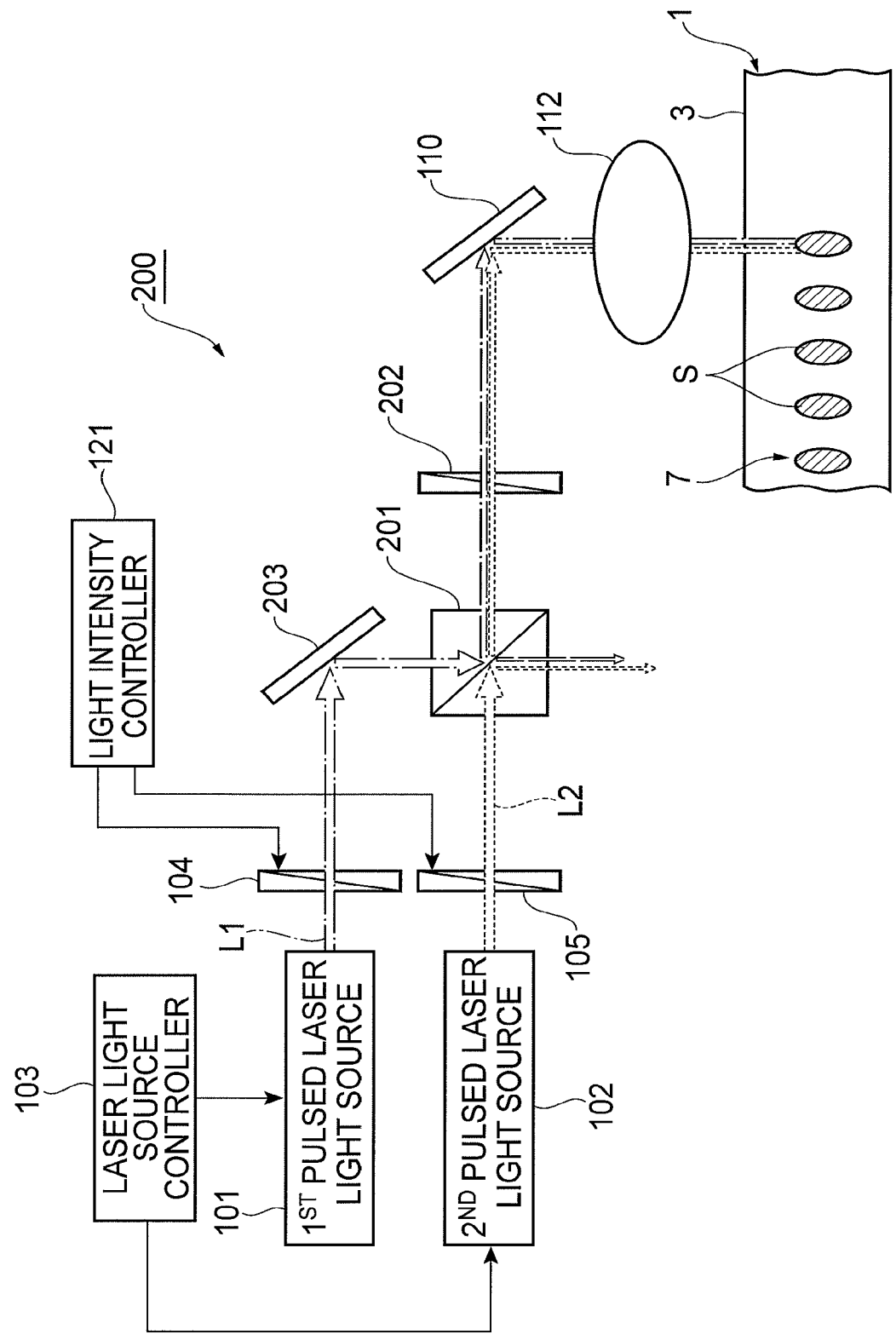
FIG. 11 is a schematic structural diagram illustrating a main part of the laser processing apparatus in accordance with a second embodiment of the present invention.

FIG. 11 is a schematic structural diagram illustrating a main part of the laser processing apparatus in accordance with the second embodiment of the present invention. As illustrated in FIG. 11, the laser processing apparatus 200 of this embodiment differs from the above-mentioned laser processing apparatus 100 in that it has a polarization beam splitter 201 in place of the polarization beam splitters 106, 107 (see FIG. 9) and further comprises a half-wave plate 202.

The polarization beam splitter (first and second polarization beam splitter) 201 is arranged behind the half-wave plate 104 on the optical axis of the first pulsed laser light L1 and behind the half-wave plate 105 on the optical axis of the second pulsed laser light L2. The polarization beam splitter 201 is adapted to handle two wavelengths, so as to polarization-separate the first pulsed laser light L1 having the direction of polarization changed by the half-wave plate 104 and the second pulsed laser light L2 having the direction of polarization changed by the half-wave plate 105.

Specifically, in the first pulsed laser light L1, the polarization beam splitter 201 transmits therethrough a constituent polarized in the vertical direction on the drawing sheet as it is, but reflects a constituent polarized in the direction normal to the drawing sheet. In the second pulsed laser light L2, the polarization beam splitter 201 transmits therethrough a constituent polarized in the vertical direction on the drawing sheet as it is, while making it concentric with the first pulsed laser light L1, but reflects a constituent polarized in the direction normal to the drawing sheet.

The half-wave plate 202 is arranged behind the polarization beam splitter 201 on the optical axis of the first pulsed laser light L1. The half-wave plate 202 changes the direction of polarization of the first pulsed laser light L1 reflected by the polarization beam splitter 201 but transmits therethrough the second pulsed laser light L2 passed through the polarization beam splitter 201 as it is. Here, the half-wave plate 202 changes the direction of polarization of the first pulsed laser light L1 from the direction normal to the drawing sheet to the vertical direction on the drawing sheet.

In thus constructed laser processing apparatus 200, the first pulsed laser light L1 emitted from the first pulsed laser light source 101 is transmitted through the half-wave plate 104, where its polarization is adjusted, and then reflected by the dichroic mirror 203, so as to be polarization-separated by the polarization beam splitter 201. The first pulsed laser light L1 reflected by the polarization beam splitter 201 is transmitted through the half-wave plate 202, where its polarization is adjusted, and then reflected by the dichroic mirror 110, so as to be made incident on the condenser lens 112.

The second pulsed laser light L2 emitted from the second pulsed laser light source 102 is transmitted through the half-wave plate 105, where its polarization is adjusted, and then polarization-separated by the polarization beam splitter 201. The second pulsed laser light L2 transmitted through the polarization beam splitter 201 is made concentric with the first pulsed laser light L1 and passes through the half-wave plate 202 as it is while in this concentric state. Thereafter, the second pulsed laser light L2 is reflected by the dichroic mirror 110, so as to be made incident on the condenser lens 112. As a consequence, the pulsed laser light L1, L2 are converged into the object 1, while their directions of polarization lie in the scanning direction.

As in the foregoing, this embodiment is effective in improving the controllability of the modified spots S as with the one mentioned above. This embodiment also allows the single laser processing apparatus 200 to be used as a processing apparatus for various substrates as in the above-mentioned first embodiment.

In this embodiment, as in the foregoing, the polarization beam splitter 201 constitutes the polarization separation means, while the polarization beam splitter 201 and dichroic mirror 203 do the concentering means.

Third Embodiment

The third embodiment of the present invention will now be explained. This embodiment will be explained mainly in terms of differences from the above-mentioned first embodiment.

Figure 12:
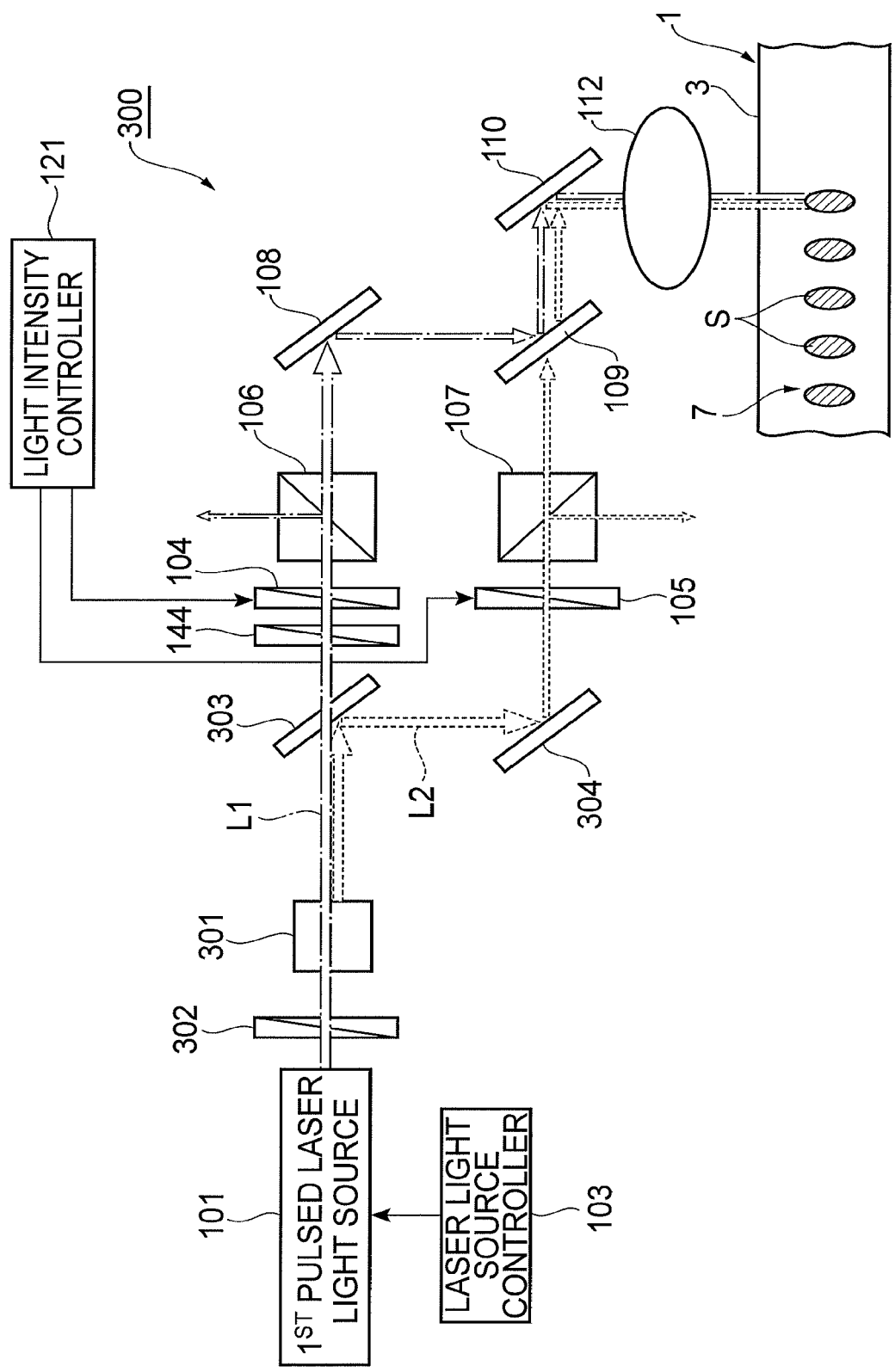
FIG. 12 is a schematic structural diagram illustrating a main part of the laser processing apparatus in accordance with a third embodiment of the present invention.

FIG. 12 is a schematic structural diagram illustrating a main part of the laser processing apparatus in accordance with the third embodiment of the present invention. As illustrated in FIG. 12, the laser processing apparatus 300 of this embodiment mainly differs from the above-mentioned laser processing apparatus 100 equipped with the two pulsed laser light sources 101, 102 in that it has one pulsed laser light source. Specifically, the laser processing apparatus 300 is not equipped with the second pulsed laser light source 102 but further comprises a nonlinear optical crystal 301.

The nonlinear optical crystal 301, for which a KTP crystal as a second harmonic generator (SHG crystal) for generating an optical harmonic is used here, performs a wavelength conversion of the pulsed laser light L1.

Specifically, when the first pulsed laser light L1 having a wavelength of 1064 nm as a fundamental wave is incident on the nonlinear optical crystal 301, the latter emits the second pulsed laser light L2 having a wavelength of 532 nm as a second harmonic concentrically with the first pulsed laser light L1. Here, the first pulsed laser light L1 whose direction of polarization tilts by 45° from the vertical direction of the drawing sheet is made incident on the nonlinear optical crystal 301, whereby the first pulsed laser light L1 and the second pulsed laser light L2 whose direction of polarization lies in the direction normal to the drawing sheet are emitted concentrically with each other.

A half-wave plate 302 for changing the direction of polarization of the first pulsed laser light L1 is disposed in front of the nonlinear optical crystal 301 on the optical axis of the first pulsed laser light L1. The half-wave plate 302 changes the direction of polarization of the first pulsed laser light L1 incident on the half-wave plate 302 from the vertical direction on the drawing sheet to the direction tilted by 45° from the vertical direction of the drawing sheet.

When forming the modified spots S within the object 1 that is a glass substrate or sapphire substrate by the laser processing apparatus 300, the first pulsed laser light L1 emitted from the first pulsed laser light source 101 is transmitted through the half-wave plate 302, where its polarization is adjusted, and then made incident on the nonlinear optical crystal 301, so as to be wavelength-converted. Subsequently, the nonlinear optical crystal 301 emits the pulsed laser light L1, L2 concentrically with each other.

The first pulsed laser light L1 emitted from the nonlinear optical crystal 301 is transmitted through a dichroic mirror 303, a quarter-wave plate 144, where elliptical polarization is turned into linear polarization, and the half-wave plate 104, where the polarization is adjusted, and then polarization-separated by the polarization beam splitter 106. The first pulsed laser light L1 transmitted through the polarization beam splitter 106 is reflected by the dichroic mirrors 108, 109 in sequence, so as to be made incident on the condenser lens 112.

The second pulsed laser light L2 emitted from the nonlinear optical crystal 301 is reflected by the dichroic mirrors 303, 304 in sequence and transmitted through the half-wave plate 105, where its polarization is adjusted, and then polarization-separated by the polarization beam splitter 107. The second pulsed laser light L2 transmitted through the polarization beam splitter 201 passes through the dichroic mirror 109, so as to become concentric with the first pulsed laser light L1, and is reflected by the dichroic mirror 110 while in this concentric state, so as to be made incident on the condenser lens 112. As a consequence, the pulsed laser light L1, L2 are converged into the object 1, while their directions of polarization lie in the scanning direction.

As in the foregoing, this embodiment is effective in improving the controllability of the modified spots S as with those mentioned above. Since the pulsed laser light L1, L2 are converged at the object 1 by using the single first pulsed laser light source 101, this embodiment makes it easier to set pulse timings such that the respective pulses of the pulsed laser light L1, L2 overlap each other.

The laser processing apparatus 300 of this embodiment can accurately form the modified spots S not only in the object 1 that is a glass substrate or sapphire substrate, but also in the object 1 that is a silicon substrate.

Specifically, the laser light source controller 103 changes the pulse width of the first pulsed laser light L1 emitted from the first pulsed laser light source 101. Here, the first pulsed laser light L1 has a pulse width (e.g., 20 nsec) longer than that in the case of forming the modified spots S in the object 1 such as a glass or sapphire substrate. This lowers the harmonic conversion efficiency of the nonlinear optical crystal 301 so that only the first pulsed laser light L1 is emitted from the nonlinear optical crystal 301 (i.e., the second pulsed laser light L2 is not substantially emitted therefrom). As a result, the pulsed laser light L1 is converged alone into the object 1, so as to form the modified spots S.

Therefore, this embodiment allows the single laser processing apparatus 300 to be used as a processing apparatus for various substrates. The single laser processing apparatus 300 can also easily handle the object 1 such as a bonded substrate constituted by silicon and glass substrates.

In this embodiment, as in the foregoing, the nonlinear optical crystal 301 and dichroic mirrors 108, 109 constitute the concentering means.

Fourth Embodiment

The fourth embodiment of the present invention will now be explained. This embodiment will be explained mainly in terms of differences from the above-mentioned third embodiment.

Figure 13:
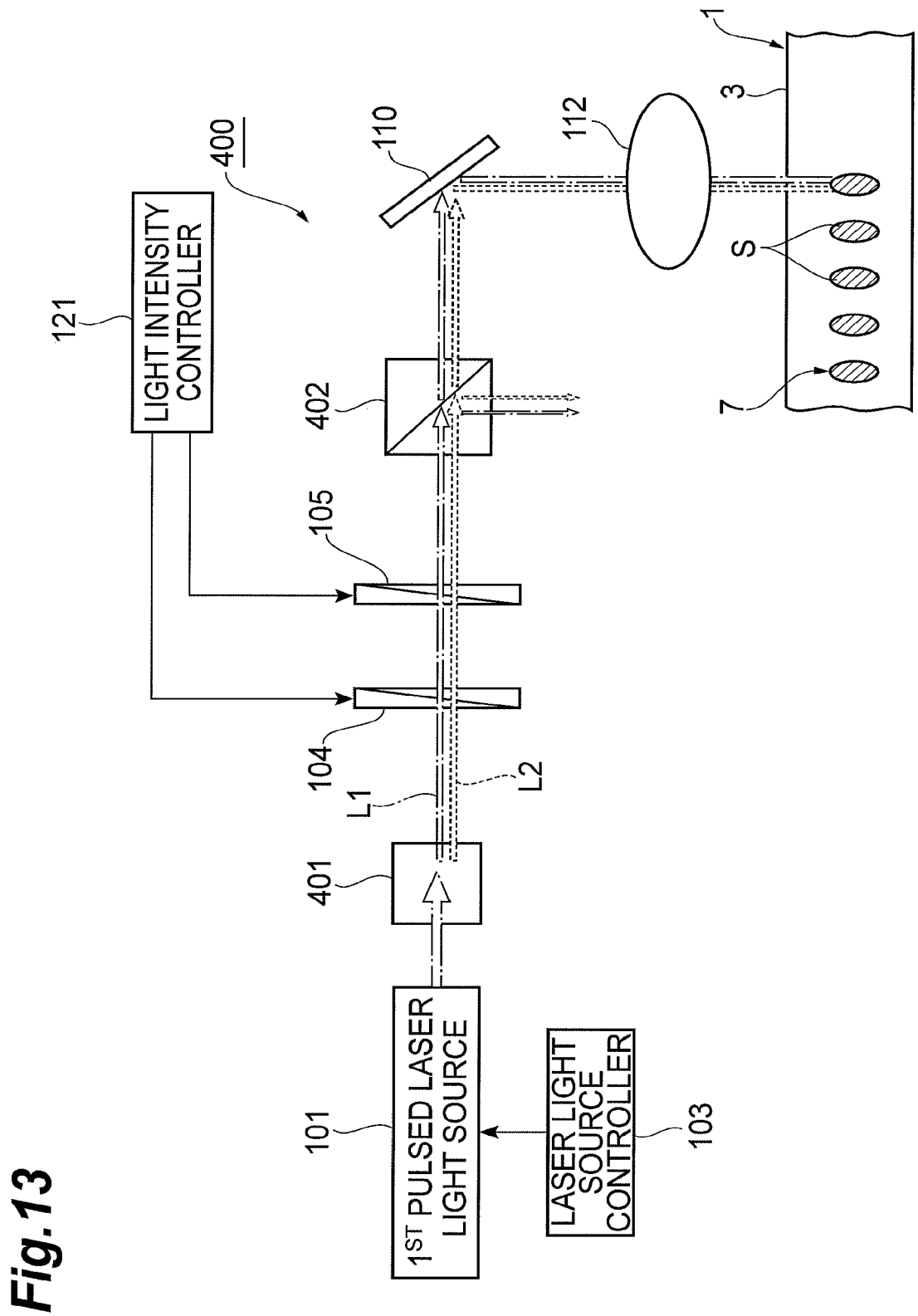
FIG. 13 is a schematic structural diagram illustrating a main part of the laser processing apparatus in accordance with a fourth embodiment of the present invention.

FIG. 13 is a schematic structural diagram illustrating a main part of the laser processing apparatus in accordance with the fourth embodiment of the present invention. As illustrated in FIG. 13, the laser processing apparatus 400 of this embodiment mainly differs from the above-mentioned laser processing apparatus 300 in that the optical axes of the pulsed laser light L1, L2 are kept concentric (completely concentric) with each other. Specifically, the laser processing apparatus 400 comprises a nonlinear optical crystal 401 in place of the nonlinear optical crystal 301 (see FIG. 12), and a polarization beam splitter 402 in place of the polarization beam splitters 106, 107 (see FIG. 12).

The nonlinear optical crystal 401, for which a BBO crystal is used here, performs a wavelength conversion of the pulsed laser light L1. When the first pulsed laser light L1 is made incident on the nonlinear optical crystal 401, the latter emits the first and second pulsed laser light L1, L2 concentrically with each other. When the first pulsed laser light L1 whose direction of polarization lies in the vertical direction on the drawing sheet is made incident on the nonlinear optical crystal 401 here, the latter emits the first pulsed laser light L1 and the second pulsed laser light L2 whose direction of polarization lies in the direction normal to the drawing sheet concentrically with each other.

The polarization beam splitter (first and second polarization beam splitter) 402, which is adapted to handle two wavelengths, is arranged behind the half-wave plates 104, 105 on the optical axis of the pulsed laser light L1, L2. The polarization beam splitter 402 polarization-separates each of the pulsed laser light L1, L2 having their directions of polarization changed by the half-wave plates 104, 105. Specifically, in each of the pulsed laser light L1, L2, the polarization beam splitter 402 transmits therethrough a constituent polarized in the vertical direction on the drawing sheet as it is, but reflects a constituent polarized in the direction normal to the drawing sheet.

In thus constructed laser processing apparatus 400, the first pulsed laser light L1 emitted from the first pulsed laser light source 101 is made incident on the nonlinear optical crystal 401, so as to be wavelength-converted, and the nonlinear optical crystal 401 emits the pulsed laser light L1, L2 concentrically with each other.

The first pulsed laser light L1 emitted from the nonlinear optical crystal 401 is transmitted through the half-wave plate 104, where its polarization is adjusted, and then the half-wave plate 105 as it is, so as to be polarization-separated by the polarization beam splitter 402. On the other hand, the second pulsed laser light L2 emitted from the nonlinear optical crystal 401 is transmitted through the half-wave plate 104 as it is and then the half-wave plate 105, where its polarization is adjusted, so as to be polarization-separated by the polarization beam splitter 402. The pulsed laser light L1, L2 transmitted through the polarization beam splitter 402 are reflected by the dichroic mirror 110, so as to be made incident on the condenser lens 112. As a consequence, the pulsed laser light L1, L2 are converged into the object 1, while their directions of polarization lie in the scanning direction.

As in the foregoing, this embodiment is effective in improving the controllability of the modified spots S as with those mentioned above. This embodiment also allows the single laser processing apparatus 400 to be used as a laser processing apparatus for various substrates as with the above-mentioned third embodiment.

Since this embodiment is constructed such that the optical axes of the pulsed laser light L1, L2 are kept concentric with each other as mentioned above, the structure of optical systems concerning the pulsed laser light L1, L2 can be made much simpler, while it becomes further easier to set pulse timings such that the respective pulses of the pulsed laser light L1, L2 overlap each other.

In this embodiment, as in the foregoing, the polarization beam splitter 402 and nonlinear optical crystal 401 constitute the polarization separation means and concentering means, respectively.

While preferred embodiments of the present invention have been explained in the foregoing, the laser processing apparatus in accordance with the present invention is not limited to the above-mentioned laser processing apparatus 100, 200, 300, 400 in accordance with the embodiments, and the laser processing method is not restricted to the above-mentioned laser processing methods in accordance with the embodiments. The present invention may also be those modified or applied to others within the scope not deviating from gist set forth in each claim.

INDUSTRIAL APPLICABILITY

The present invention can improve the controllability of modified spots.

REFERENCE SIGNS LIST

1 . . . object to be processed; 5 . . . line to cut; 7 . . . modified region; 100, 200, 300, 400 . . . laser processing apparatus; 101 . . . first pulsed laser light source (first laser light source); 102 . . . second pulsed laser light source (second laser light source); 103 . . . laser light source controller (pulse width control means); 104 . . . half-wave plate (first half-wave plate); 105 . . . half-wave plate (second half-wave plate); 106 . . . polarization beam splitter (first polarization beam splitter, polarization separation means); 107 . . . polarization beam splitter (second polarization beam splitter, polarization separation means); 112 . . . condenser lens; 108, 109, 203 . . . dichroic mirror (concentering means); 121 . . . light intensity controller (light intensity control means); 201 . . . polarization beam splitter (first and second polarization beam splitter, polarization separation means, concentering means); 301, 401 . . . nonlinear optical crystal (concentering means); 402 . . . polarization beam splitter (first and second polarization beam splitter, polarization separation means); L1 . . . first pulsed laser light; L2 . . . second pulsed laser light; S . . . modified spot; α . . . intensity threshold

The invention claimed is:

1. A laser processing method for processing an object thereby forming a plurality of modified spots within the object along a cutting line, the plurality of modified spots forming a modified region, the method comprising:

changing, by a first half-wave plate, a direction of polarization of a first pulsed laser light having a first wavelength;

changing, by a second half-wave plate, a direction of polarization of a second pulsed laser light having a second wavelength different from the first wavelength;

separating the first pulsed laser light having the direction of polarization changed by the first half-wave plate and the second pulsed laser light having the direction of polarization changed by the second half-wave plate; and focusing, by a condenser lens, the first pulsed laser light and the second pulsed laser light at the object through the condenser lens;

controlling an intensity of the first pulsed laser light and the second pulsed laser light that are polarization-separated by varying the directions of polarization of the first pulsed laser light changed by the first half-wave plate and the second pulsed laser light changed by the second half-wave plate, wherein the first pulsed laser light has an intensity that is within a predetermined intensity range at which the plurality of modified spots are not formed when only the first pulsed laser light is focused at the object without focusing the second pulsed laser light, and the second pulsed laser light has an intensity that is equal to or greater than an intensity at which the plurality of modified spots are formed when only the second pulsed laser light is focused at the object without focusing the first pulsed laser light, and wherein a region in which the first pulsed laser light is focused and a region in which the second pulsed laser light is focused overlaps.

2. The laser processing method according to claim 1, wherein the first pulsed laser light has a wavelength longer than that of the second pulsed laser light.

3. The laser processing method according to claim 1, further comprising making the first pulsed laser light and the second pulsed laser light concentric with each other.

4. The laser processing method according to claim 1, wherein the separating of the first pulsed laser light is performed by a first polarization beam splitter.

5. The laser processing method according to claim 1, wherein the separating of the second pulsed laser light is performed by a second polarization beam splitter.

6. The laser processing method according to claim 1, wherein a range of light intensity for the first pulsed laser light is greater than a range of intensity for the second pulsed laser light.

* * * * *